Nov. 8, 1955    H. C. SUNDSTROM    2,722,910
FARROWING PEN
Filed Oct. 23, 1952
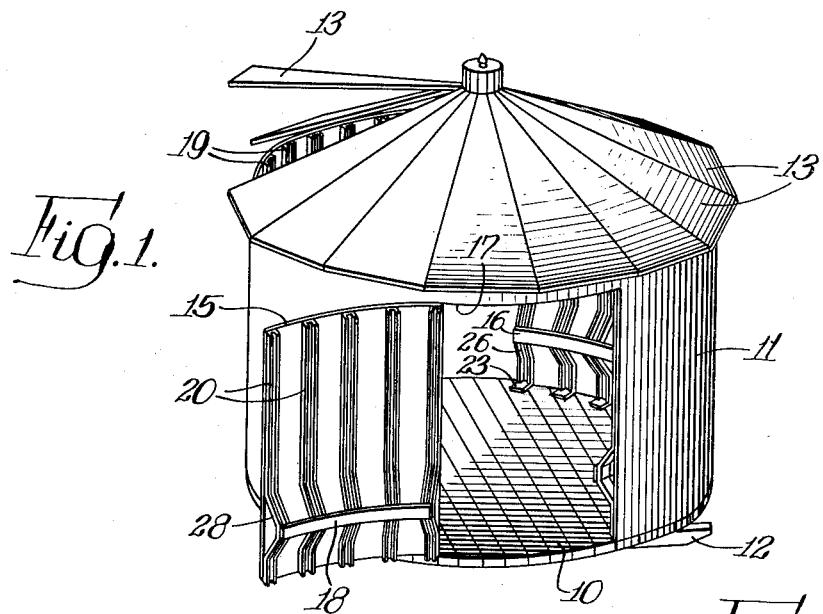
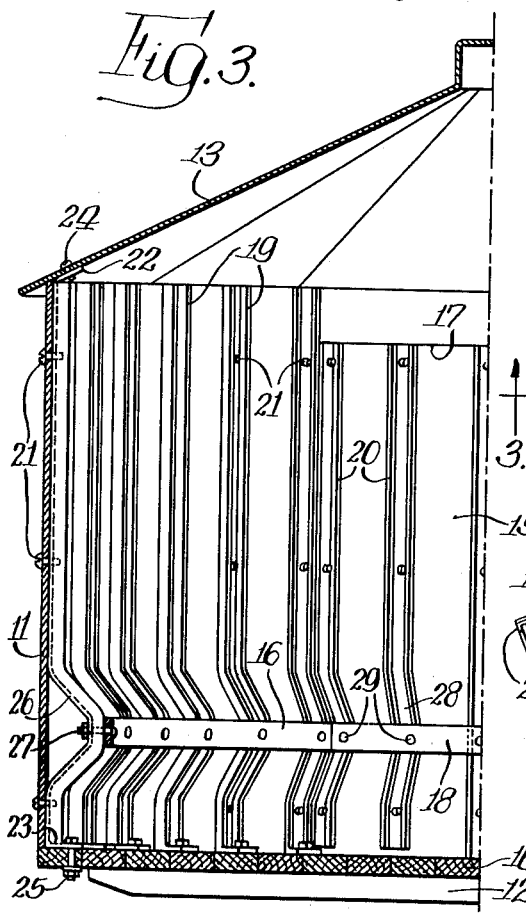
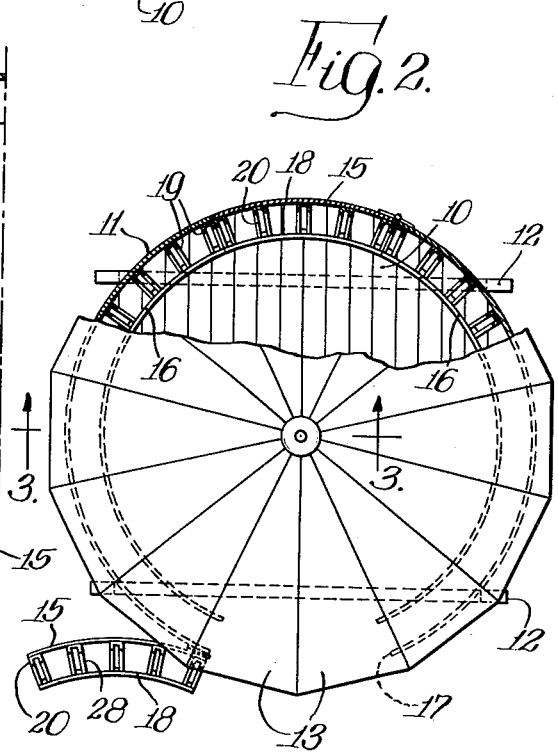
INVENTOR.
Harold C. Sundstrom,
BY
Davis Lindsey Hibben + Noyes
Attys.

_United States Patent Office_ 2,722,910
Patented Nov. 8, 1955

2,722,910

FARROWING PEN

Harold C. Sundstrom, Chicago, Ill.

Application October 23, 1952, Serial No. 316,494

5 Claims. (Cl. 119—19)

This invention relates to a novel building or shelter for animals and more particularly to a novel farrowing house for hogs.

It is customary among farmers and hog raisers to confine an expectant female hog in a special farrowing house or shelter in which the newly born pigs are kept with the mother for some time after birth. However, it is well known that there is a constant danger that the young pigs will be injured or killed by being crushed against the sides or floor of the farrowing house either inadvertently or intentionally by the mother hog or sow. Ordinarily, such houses or shelters are relatively small so that with a large litter of young pigs the danger is even greater.

It has previously been suggested to provide compartmented houses or special protective runways into which the young pigs can escape when necessary. However, such proposed arrangements have been unnecessarily complicated and expensive and do not always provide an entire satisfactory solution to the problem.

An important object of my invention is to provide a novel animal house characterized by simplicity and relative inexpensiveness of construction.

A further object of the invention is to provide a novel farrowing house for hogs which is adapted to provide reliable and effective protection for young pigs regardless of the maneuvers of the mother hog.

Another object of the invention is to provide a farrowing house for hogs having novel guard means for the protection of young pigs and wherein the guard means also cooperates with and strengthens the structure of the house.

An additional object of the invention is to provide a novel protective device for young pigs which is especially adapted for use with a hog house of the light weight, inexpensive, knock-down type.

Other objects and advantages of the invention will become apparent from the subsequent detailed description taken in conjunction with the accompanying drawing wherein:

Fig. 1 is a perspective view of a hog house constituting one specific embodiment of my invention, the doors of the house being open to reveal the interior construction;

Fig. 2 is a plan view of the structure with one of the doors closed and with a portion of the roof broken away; and Fig. 3 is an enlarged fragmentary vertical sectional view taken substantially on the line 3—3 of Fig. 2.

The hog house shown in the drawing comprises a generally circular structure including a wooden base or floor 10 having an upright circular or cylindrical wall 11 extending around the base 10 and secured thereto in any suitable manner. Preferably, the continuous circular wall 11 of the structure is made of light weight sheet material such as galvanized metal sheets. The base 10 has secured to its underside a pair of elongated skids 12 to permit the structure to be readily pulled from one location to another by means of a tractor or the like. The roof of the structure is generally cone-shaped and comprises a plurality of triangular sections or segments 13.

As indicated in Fig. 1, at least one of the roof sections 13 is pivotally mounted to permit ventilation of the hog house when desired. A pair of oppositely disposed hinged doors 15 are provided in the wall 11 of the structure, these doors likewise being preferably formed from light weight sheet metal and being suitably curved so as to provide in effect a continuous cylindrical or circular side wall 11 when the doors are in closed position. It will be understood that only a single door may be used if desired.

The primary novel feature of the present invention resides in a guard means or protective structure which is provided in the interior of the hog house in order to prevent injury to the young pigs by the mother hog. The protective device consists of a circumferentially extending guard rail or spacer band which extends completely around the inner periphery of the cylindrical wall 11. In this instance, the band is formed in four parts of which two relatively long portions designated at 16 are rigidly mounted on the wall 11 intermediate the door openings, indicated at 17, and the other two are relatively short pieces, identified by the reference numerals 18, which are rigidly secured at the inside of each of the hinged doors 15. The multiple part spacer band 16—18 is secured in elevated relation above the bottom edge of the wall 11 and above the floor 10 and in radially spaced relation from the side wall of the house by means of a plurality of upright members or ribs, indicated generally at 19 and 20.

The ribs 19 consist of elongated one-piece channel members of U-shaped cross section having their base portions secured, as by a plurality of screws 21, against the inner surface of the circular wall 11 and with the side portions of the channel members extending radially inwardly. The ribs 19 are secured in circumferentially spaced relation around the interior of the house and preferably extend from the top to the bottom of the side wall. The ribs 19 are also provided at their upper and lower ends with inwardly extending flanges 22 and 23, respectively. The flanges 22 are detachably secured, as by screws or bolts 24, to the roof sections 13 and the bottom flanges 23 are secured to the floor 10 by similar screws or bolts 25. Each of the upright ribs 19 also has an inwardly bent projection or hump portion 26 to which a section 16 of the spacer band is fastened by screws 27 or is otherwise rigidly secured. The ribs 20 on the doors 15 are similar in construction to the ribs 19 except that the upper and lower flanges are omitted. The rib members 20 likewise have inwardly bent projecting portions, indicated at 28, and the spacer band sections 18 are mounted thereon by screws 29. It will be understood from Figs. 2 and 3 that the location of the inwardly extending projections 26 and 28 on the ribs 19 and 20 are so arranged that when the doors 15 are in closed position the spacer band sections 16 and 18 are disposed in substantial alignment so as to define in effect a continuous circular band extending around the entire periphery of the closed house.

When the doors are in closed position, the curved band 16—18 provides a barrier or obstruction which effectively prevents the mother hog from coming into close contact with the side wall of the house. In addition, the elevated and inwardly spaced location of the band 16—18, as provided by the brackets or ribs 19 and 20, results in an annular refuge space below the spacer band and adjacent the lower portion of the wall within which the young pigs can dispose themselves out of harmful contact with the mother hog.

I have found that a spacer band arrangement of the type thus described is highly effective provided it is used in conjunction with a building of generally circular construction. As long as the spacer band has a generally circular contour on a relatively restricted radius so that the curvature of the band is relatively pronounced, it is practically impossible for the mother hog to maneuver herself into any position which would result in crushing or smothering of the young pigs. In other words, the arcuate shape of the spacer band as a result of the relatively small diameter of the circular house provides an additional protective feature and further prevents the mother hog from coming into close flatwise contact with the side wall of the house. Obviously, if the house had a rectangular or other non-circular shape so that relatively flat walls were provided, this additional protective feature would not be realized.

The particular combination of the multiple-part spacer band and the upright brackets or ribs for mounting the spacer band has another important advantage in my invention. As previously mentioned, the wall 11 and the doors 15 as well as the roof sections 13 are preferably made of light weight sheet metal. Because of the fact that the upright ribs 19 and 20 are circumferentially spaced around the entire inner periphery of the house and extend substantially over the entire vertical height of the house, it will be seen that the ribs impart a valuable stiffening or bracing effect so that the light weight sheet metal structure has a high degree of rigidity and structural strength. In addition, the ribs 19 are secured by flanges 22 and 23 to the roof and floor of the structure thereby further strengthening the house. By reason of this construction, I am able to utilize light weight sheet metal for the roof 13, the side wall 11, and the doors 15 which would not otherwise be feasible. Thus the brackets or ribs 19 and 20 serve the dual function of mounting the spacer band 16—18 and also imparting sufficient rigidity and structural strength to the house to permit the use of light weight sheet metal as the principal structural material. It will also be understood that the U-shaped channel construction of the members 19 and 20 also imparts an additional stiffening effect. Moreover, the inwardly projecting portions 23 and 25 of the brackets 19 and 20 are effectively and rigidly interconnected by means of the spacer band sections 16 and 18 thereby imparting additional structural rigidity and stiffness.

Although I have shown a house with two doors, it will often be desirable in a small hog house to use only a single door. To further simplify the construction, I may omit the floor 10 and simply permit the circular side wall of the house to rest directly on the ground. I may also omit the spacer band section from the door in some cases, e. g. where the house is small and there is only one door.

From the foregoing description, it will be seen that my invention provides a relatively simple and inexpensive farrowing house which is especially adapted for use in a knock-down type construction utilizing light weight sheet metal as the principal structural material. In addition, the use of a multiple part spacer band permits the house to be provided with any desired number of doors while at the same time affording complete protection for the young pigs around the entire periphery of the house when the doors are closed.

Although the invention has been described with particular reference to a specific structural embodiment, it will be understood that various modifications and equivalent structures may be resorted to without departing from the scope of the invention as defined in the appended claims.

I claim:

1. An animal house comprising an upright circular wall, a plurality of upright members rigidly secured to the inner surface of said wall and spaced circumferentially therearound, said members having radially inwardly projecting portions adjacent their lower ends but spaced above the bottom edge of said wall, and a substantially circular guard rail rigidly secured to said projecting portions whereby to define an annular refuge space for young animals adjacent the lower portion of the wall below said rail.

2. An animal house comprising an upright circular wall of relatively light weight sheet material, a plurality of upright elongated ribs rigidly secured to the inner surface of said wall and spaced circumferentially therearound whereby to impart stiffness and structural rigidity to said wall, said ribs extending substantially from the top to the bottom of said wall and having inwardly bent mounting portions projecting radially inwardly relative to said wall and in spaced elevation above the bottom thereof, and a substantially circular spacer band rigidly secured to said mounting portions and extending substantially around the periphery of the house whereby to define an annular refuge space for young animals adjacent the lower portion of said wall and below said band.

3. The device of claim 2 further characterized in that said ribs comprise elongated one-piece channel members of generally U-shaped cross section with the base portions thereof contacting said wall and the side portions thereof extending radially inwardly.

4. An animal house comprising a floor, an upright circular wall of relatively light weight sheet material, a roof, a plurality of upright ribs rigidly secured to the inner surface of said wall and spaced circumferentially therearound, said ribs extending from the top to the bottom of said wall and being also rigidly secured at their opposite ends to said floor and to said roof whereby to impart stiffness and structural rigidity to the house, said ribs also having inwardly bent mounting portions projecting radially inwardly relative to said wall and in spaced elevation above said floor, and a substantially circular spacer band rigidly secured to said mounting portions and extending substantially around the periphery of the house whereby to define an annular refuge space for young animals adjacent the lower portion of said wall and below said band.

5. An animal house comprising an upright circular wall having at least one door therein, a plurality of upright rib members rigidly secured to the inner surface of said wall and said door and spaced circumferentially around the house, said rib members having radially inwardly projecting portions adjacent their lower ends but spaced above the bottom of said wall, and a generally circular multiple section band having a part thereof rigidly secured to the projecting portions of the ribs on the wall and part thereof similarly secured to the ribs on the door, the band section on the door being adapted to be aligned with the section on the wall when the door is closed whereby to define an annular refuge space for young animals adjacent the lower portion of said wall and below said band.

References Cited in the file of this patent

UNITED STATES PATENTS

| | | |
|---|---|---|
| 129,980 | Osborn et al. | July 30, 1872 |
| 569,516 | Powers | Oct. 13, 1896 |
| 700,949 | Klindworth | May 27, 1902 |
| 1,039,255 | Clarke | Sept. 25, 1912 |
| 1,644,212 | Walsh | Oct. 4, 1927 |
| 2,120,262 | Rodees | June 14, 1938 |
| 2,530,485 | Shannon | Nov. 21, 1950 |